Feb. 5, 1963 W. E. RULE ET AL 3,076,431
METHOD AND DEVICE FOR DETECTING PERIOD OF HEAT IN COWS
Filed Feb. 8, 1960
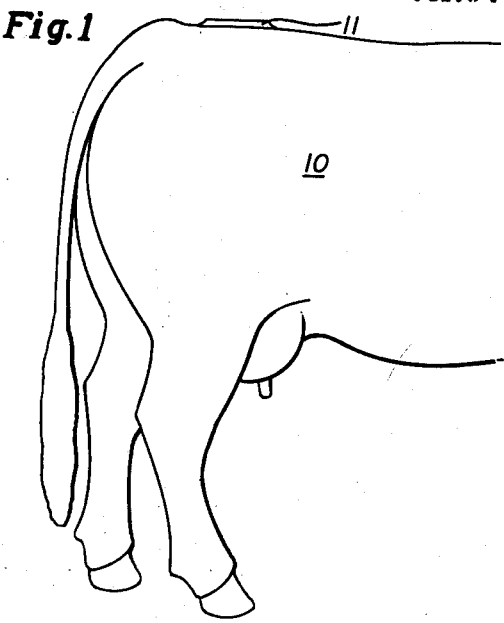
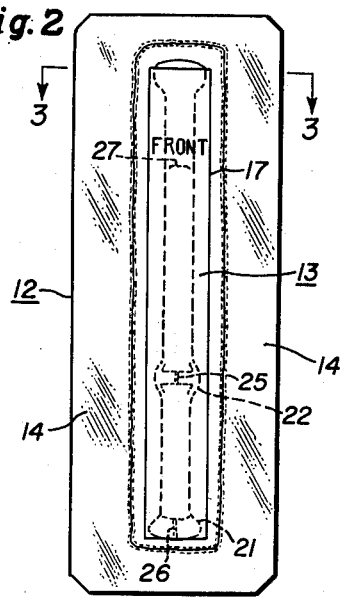
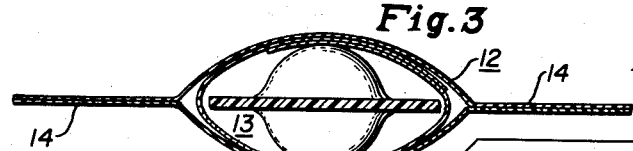
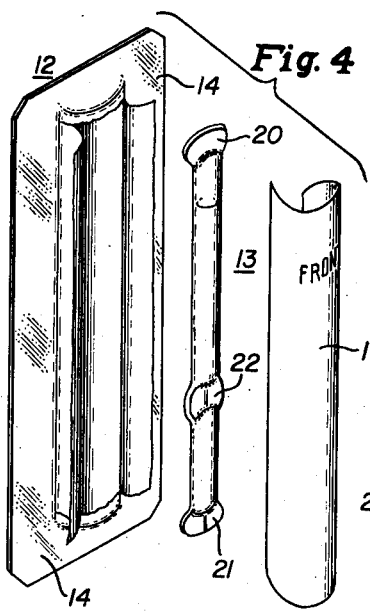
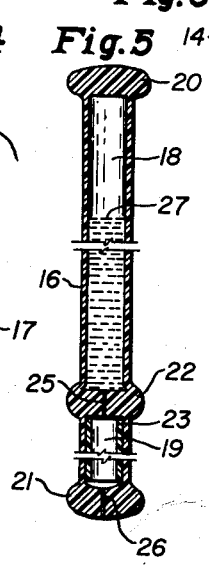
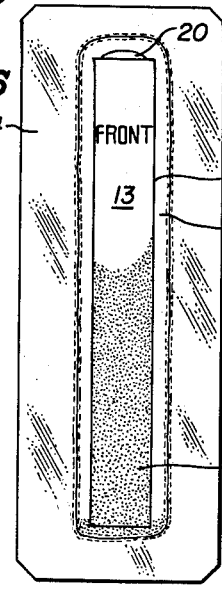
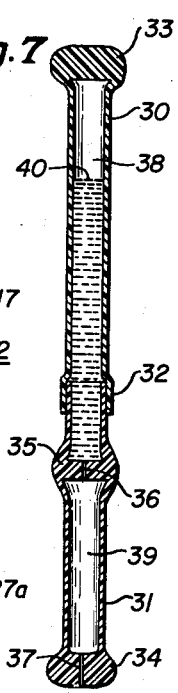
INVENTORS.
Wilbur E. Rule
Earl D. Smith
BY
ATTORNEYS

United States Patent Office 3,076,431
Patented Feb. 5, 1963

3,076,431
METHOD AND DEVICE FOR DETECTING PERIOD OF HEAT IN COWS
Wilbur E. Rule and Earl D. Smith, Steamboat Springs, Colo., assignors to Kamar, Inc., a corporation of Colorado
Filed Feb. 8, 1960, Ser. No. 7,256
24 Claims. (Cl. 119—1)

This invention relates to the field of animal husbandry and particularly to an improved method and device for determining when cows are in heat.

It is frequently desirable to determine when individual cows in a herd are in heat. For example, in the dairy industry today efforts to improve the stock by selective breeding have resulted in the use of artificial insemination, which has come into widespread use. For the purposes of artificial insemination it is necessary to determine accurately and reliably when the cows are in heat. Various methods and devices have been employed for this purpose; however, they have not proved entirely satisfactory or sufficiently reliable under all conditions. Accordingly it is an object of this invention to provide an improved method for reliably detecting the period of heat in cows.

Another object of this invention is to provide an improved device for detecting the period of heat in cows.

Another object of the invention is to provide an improved device for detecting heat in cows which is not affected by weather and which includes a positive and easily observed indicator.

Briefly, in carrying out the objects of this invention the cows in a herd which are in heat are detected by a method which includes determining the period of mounting of one cow by another and the marking of the cows which allow themselves to be mounted for a period in excess of a predetermined time of the order of five seconds. Further, in carrying out the objects of the invention in one embodiment, the improved detecting device is constructed to comprise an elongated body providing a collapsible walled chamber partially filled with a liquid and connected by a metering passage with a rigid walled chamber of predetermined capacity which in turn is in communication with the outside through a metering or capillary passage. The body is wrapped in a layer of absorbent material such as paper and this is sealed in a transparent envelope. The liquid preferably is dyed so that upon emergence from the second chamber it is absorbed by the paper wrapping and gives a visible indication. The sizes of the chamber and of the metering passages are selected to give a timing indication of the period during which the flexible walled chamber is under pressure. The device is cemented or otherwise secured on the cow's back near the rump and provides an indication of the mounting of the cow for a period of in excess of a preselected number of seconds.

The features of novelty which characterize the invention are pointed out with particularity in the appended claims; the invention itself, however, both as to its method of use and the details of its structural organization, together with further objects and advantages, will be better understood from the following description taken in connection with the accompanying drawing, in which:

FIG. 1 illustrates a device embodying the invention secured in position on a cow;

FIG. 2 is an enlarged plan view of the device;

FIG. 3 is a further sectional view taken along the line 3—3 of FIG. 2;

FIG. 4 is an exploded perspective view showing the outer envelope broken open and the parts in spaced relationship thereto;

FIG. 5 is an enlarged longitudinal sectional view of the pressure responsive element of the device of FIG. 2;

FIG. 6 is a view similar to FIG. 2 with the device shown after operation; and

FIG. 7 is a view similar to FIG. 5 illustrating a modified form of the invention.

During studies of the problems incident to artificial insemination of cows and particularly the problem of determining when the individual cows reach their periods of heat, it has been observed that cows when not in heat do not allow other animals to mount them for more than a moment but that a cow in heat will allow herself to be mounted for an appreciable time. It has been determined by observation of the conduct of cows in a herd that any cow which is mounted for a period in excess of about three seconds is found to be in heat. In the practice of the present invention a plurality of cows are kept together in a herd and the periods of mounting of one cow by another are timed. Those cows which are mounted for a predetermined period, of the order of five seconds, are then marked to indicate that they are in heat.

When practicing the foregoing method for determining when a cow is in heat it is desirable to employ an automatic device for indicating when a cow has been mounted for a time equal to or greater than the predetermined time.

Referring now to the drawing, FIG. 1 illustrates the rear half of a cow 10 and a device 11 embodying the invention secured in position on the cow's backbone above the rump. The device is in a position such that when the cow is mounted the relatively hard brisket of the mounting animal compresses the device against the cow's backbone area. Should this compression continue for a predetermined time, the device will give a visible indication which may be observed and the cow then removed from the herd. It is thus apparent that the timing device makes it possible to mark the cows without continued presence of an attendant to observe the herd, time the mounting period, and mark the cows.

The details of construction of a timing or detecting device embodying the invention are shown in FIGS. 2 through 5. The device as illustrated comprises a transparent envelope 12 of plastic or other suitable flexible material within which is positioned a detector element 13, the element being sealed in a pocket formed by bonding the edges of the envelope 12 together throughout the marginal areas 14 surrounding the pocket containing the detector 13.

The detector 13 comprises an elongated tubular member 16 wrapped in a fold or tube of porous paper 17. The member 16 is formed of flexible plastic material such as a flexible vinyl tubing and is divided into two chambers 18 and 19, the tubing being sealed at both ends 20 and 21 and formed to provide a dividing wall 22 between the two chambers. The smaller chamber 19 is filled with a length of rigid plastic tubing 23 lying within the tubing member 16 so that the walls of the chamber 19 are rigid. The rigid tube may be made of any suitable hard plastic material and, for example, may be hard cellulose acetate butyrate. The chambers 18 and 19 are connected in communication through a capillary passage 25 in the wall 22 and the chamber 19 is connected with the outside through a similar passage 26 in the end wall 21 of the chamber. The end seals and the dividing wall are made by applying heat and pressure to the tubing, the rigid tube 23 being inserted before sealing the end walls of the chamber 19. The passages 25 and 26 are formed by molding a straight wire in position during the heating and compressing of the walls 21 and 22 and thereafter withdrawing the wire to leave the passages.

Before the chamber 18 is sealed off it is charged with a body of liquid 27 which is preferably colored or dyed so that it constitutes a readily observable indicating medium. It will now be observed that when the collapsible walls of the chamber 18 are compressed the liquid 27 is forced out through the passage 25 into the chamber 19. The air or gas within the chamber 19 acts as a cushion and prevents the discharge of liquid due to accidental short or slight compressions of the flexible walls and prevents the driving of a jet of liquid through the passage 25 under such conditions. If the pressure is released the liquid returns due to the resilient characteristics of the plastic walls and their return to original shape. The liquid, preferably ethylene glycol, tends to remain in a body in the chamber 19 rather than spreading over the walls, and substantially the entire body thereof returns to the chamber 18 on release of pressure provided the chamber is not tilted to lie below the wall 22. However, should the pressure be continued until the chamber 19 has been filled, any further discharge of liquid in the chamber 18 will force liquid out of the chamber 19 through the passage 26, whereupon it will stain the paper 17 and indicate its presence so that it is easily observed, as shown in FIG. 6 by the shaded area 27a.

The device is attached to the animal by a suitable adhesive or cement which is preferably of non-setting type such as that employed in stockyards for applying tags to animals. The device is positioned so that the end containing the flexible chamber 18 is in a forward position; this is indicated by the word "Front" printed on the paper 17 at the end adjacent the chamber 18. This position of the device is preferred because of the pressure changes effected during the mounting of the cow, the pressure continuing more positively as the mounting animal may slide rearwardly; thus the liquid chamber is in a position to facilitate forcing the liquid from chamber 18 to chamber 19 longer and more uniformly during the mounting.

The sizes of the chamber 19 and of the passages 25 and 26 are selected so that for continued pressure on the chamber 18 the liquid will fill and be discharged from the chamber 19 in an average time of, say, five seconds. This allows for variations in time due to pressure changes and temperature changes which may affect the flexibility of the plastic slightly and also the rate of flow of the liquid, and is a sufficient time to give a positive indication that the mounted cow is in heat.

When the device has been operated and has provided its indication by staining the paper 17, it is discarded. Before the staining in this manner, however, it may be pressed to partially fill the chamber 19 many times without adversely affecting its timing, the liquid returning to the chamber 18 after each pressure application.

FIG. 7 illustrates another embodiment of the timing device of the invention which operates in essentially the same manner as the embodiment just described. In this form the tubular timing element comprises a flexible tube portion 30 and a rigid tube portion 31 sealed together at 32. The flexible tube 30 is sealed at its other end at 33 by heat and pressure in the same manner as the flexible tube in the first embodiment. The rigid tube 31 is similarly formed to provide an end seal 34 and a dividing wall 35, having passages 36 and 37, respectively, similar to the passages 25 and 26 of FIG. 5. Thus a collapsible walled chamber 38 and a rigid walled chamber 39 are provided. The chamber 38 is charged with a body of indicating liquid 40 and the device is employed in the same manner as that of FIG. 5.

It will be understood that the size and structural features of the device and the liquid employed may be varied according to the conditions to be met in operation. However, as a guide in practicing the invention, the following example of an effective operating device may be found useful: A heat detector constructed as shown in FIGS. 2 through 5 was made from a length of flexible vinyl tubing sold under the trade-mark "Tygon." The chamber 19 was formed by inserting in the vinyl tube a rigid tube of cellulose acetate butyrate. The capillary passages 25 and 26 were made by inserting a straight wire (.006 inch diameter) in the walls 21 and 22 during their formation. The chamber 18 was charged with a liquid comprising two parts ethylene glycol and one part water colored with Congo red water-soluble dye.

The dimensions were as follows:

Tube 16:
    Outside diameter _____ inch __ 1/4
    Inside diameter _____ do ____ 3/16
Tube 23:
    Length _____ do ____ 3/8
    Outside diameter _____ do ____ 3/16
    Inside diameter _____ do ____ 1/8
Length of chamber 18 _____ do ____ 1 1/2
Length of chamber 19 _____ do ____ 1/2

The charge of liquid filled the chamber 18 to slightly over two thirds its volume and the timing of the device when under steady pressure was such that the liquid would be discharged from the second chamber in about three seconds. The paper was selected to provide a clear contrast in color when met by the dye. When the device was mounted on the animals the timing was approximately five seconds, the difference in timing being due to the differences in pressure encountered during use. Devices constructed in this manner when wrapped in absorbent paper and sealed in a transparent envelope were found effective as timing elements in the detection of cows in heat in accordance with the method of this invention.

While the invention has been described in connection with specific forms of the device, various changes and modifications will occur to those skilled in the art. Therefore, it is not desired that the invention be limited to the specific details illustrated and described and it is intended by the appended claims to cover all modifications which fall within the spirit and scope of the invention.

We claim:
1. The method for sorting cows to facilitate the artificial insemination thereof which comprises detecting when a cow is in heat by keeping a plurality of cows together, placing on each cow in a position to render it operative during the mounting of the cow by another a device for initiating timing of the duration of the period of mounting, and upon continuous mounting of one cow by another for a period of time exceeding about three seconds marking the mounted cow.

2. The method for sorting cows as set forth in claim 1 wherein said devices for initiating timing of the duration of mounting are pressure responsive, and including the step of cementing each of the devices to the respective cow's backbone area above the rump.

3. A pressure responsive timing device for facilitating the detection of the period of heat in cows which comprises a fluid retaining element providing a collapsible walled chamber and a rigid walled chamber, means providing a first bleeder passage between said chambers and a second bleeder passage between the second chamber and the outside, and a body of liquid in said first chamber, said body of liquid having a volume greater than that of said second chamber, said liquid being discharged by pressure on the walls of said first chamber and passing through said first passage into said second chamber, the capacity of said second chamber being such that it will be filled and will discharge liquid to the outside through said second passage in a predetermined average time of the order of five seconds and exceeding approximately three seconds during the continued application of pressure to deform the walls of said first chamber.

4. A pressure responsive timing device as set forth in claim 3 including a body of liquid absorbing material adjacent the outlet of said second passage and means for effecting a change of color of said material upon wetting by said liquid.

5. A pressure responsive timing device as set forth in claim 3 including a transparent element for enclosing said fluid retaining element in a sealed substantially fluid tight pocket and wherein said liquid is colored to provide a readily observable indication upon its discharge from said fluid retaining element.

6. A pressure responsive timing device as set forth in claim 3 wherein said liquid fills said first chamber only partially to provide a gas pocket therein and form a cushion to minimize the discharge of indicating liquid upon the application of momentary pressure to the walls of said first chamber.

7. A pressure responsive timing device as set forth in claim 3 wherein said element is of tubular configuration and comprises an outside tube of flexible material and an internal rigid tube closely fitting the walls of said second chamber.

8. A pressure responsive timing device as set forth in claim 5 including a wrapping of absorbent paper about said fluid retaining element to facilitate the ready visibility of the liquid upon discharge from said fluid retaining element.

9. A pressure responsive indicating device for facilitating the detection of the period of heat in cows which comprises a liquid retaining element having a first chamber, said first chamber having a collapsible wall and being closed except for a bleeder passage providing a discharge opening, a body of liquid in said first chamber whereby deformation of the walls of said first chamber under pressure discharges liquid through said bleeder passage, and means including a second chamber communicating with said discharge passage for accumulating the discharged liquid and delaying the discharge of liquid from said first chamber to the outside upon continued pressure on the walls of said first chamber for a predetermined interval of time after the initial application of such pressure.

10. A pressure responsive indicating device as set forth in claim 9 including means limiting the deformation of the walls of said second chamber under pressure for assuring a predetermined capacity thereof.

11. A pressure responsive indicating device for facilitating the detection of the period of heat in cows which comprises flexible wall means providing a closed chamber, a body of liquid in said chamber, the walls of said chamber having a bleeder passage therein for affording discharge of liquid from the chamber upon collapse of the walls thereof, means for accumulating liquid discharged through said passage for delaying the discharge of liquid from said device until a predetermined quantity of liquid has been discharged from said chamber, and means utilizing the liquid discharged from said accumulating means for providing an indication of such discharge.

12. The method for facilitating the segregation of cows for artificial insemination which comprises determining when a cow is in heat by keeping two or more cows herded together, timing the duration of pressure contact between cows during mounting of one cow by another and utilizing the continuation of such pressure for a predetermined duration of time greater than about three seconds to effect marking of the mounted cow, and segregating any marked cows.

13. The method for facilitating the artificial insemination of cows as set forth in claim 12 wherein the timing step is effected by providing a plurality of pressure responsive timing devices adapted to be actuated by compression between cows during mounting and attaching one of said devices to each cow in the area of the backbone above the rump whereby pressure is applied to the device by the mounting animal upon mounting of the cow, and utilizing the continuous actuation of any of said devices for a predetermined period of over about three seconds for effecting the marking of the cow on which it is secured.

14. A device for facilitating the detection of heat in cows comprising a timing element, means adapted to be actuated by pressure between two such animals for effecting the operation of said timing element, and means dependent upon the continuous maintenance of pressure on said pressure dependent means to effect operation of said element continuously for a predetermined period and regardless of the subsequent application and release of pressure for providing and maintaining a visual indication thereof.

15. A device as set forth in claim 14 wherein said predetermined period is of the order of five seconds and is greater than three seconds.

16. A device as set forth in claim 14 wherein said timing element includes means for returning it to its initial condition upon release of the mechanical pressure after application of the pressure for a period less than three seconds.

17. A device for facilitating the detection of heat in cows comprising a timing element, means dependent upon mechanical pressure for effecting the operation of said element, and means dependent upon operation of said element continuously for a predetermined period for providing and maintaining a visual indication thereof, said means dependent upon mechanical pressure comprising a collapsible walled chamber filled with a liquid and said timing element comprising an accumulating chamber connected in restricted communication with said collapsible chamber.

18. A device for facilitating the detection of heat in cows comprising a timing element, means dependent upon mechanical pressure for effecting the operation of said element, and means dependent upon operation of said element continuously for a predetermined period for providing and maintaining a visual indication thereof, said means for maintaining a visual indication of the operation of said element comprising a liquid stainable member, said device containing a body of liquid adapted to stain said member, and said means dependent upon operation of said element being arranged to discharge liquid from said body onto said member.

19. A pressure responsive indicating device for facilitating the detection of heat in cows which comprises means providing a chamber having a body of liquid therein and a metering passage for affording discharge of liquid from the chamber, said means being effective on application of pressure to said device to force liquid out of said chamber through said metering passage, means arranged in communication with said passage for accumulating liquid discharged through said passage and effecting upon continuous accumulation of liquid for a period of time exceeding three seconds and of the order of five seconds to discharge liquid onto said marking means, and marking means positioned adjacent said accumulating means for receiving liquid discharged therefrom, said marking means being effective upon wetting by said liquid to provide a visual indication thereof.

20. A device for indicating the period of heat in a cow which comprises a pressure responsive device adapted to be placed on the rump of said cow, indicating means associated with said device, operative after at least three seconds of continuous pressure on said device, whereby a second animal mounting said cow will cause actuation of said means.

21. A device for indicating the period of heat in a cow which comprises a pressure responsive device adapted to be cemented on the rump of said cow, indicating means associated with said device, operative after a period of approximately three seconds of continuous pressure on said device, whereby a second animal mounting said cow for such period will cause actuation of said means.

22. A device for indicating the period of heat in a cow which comprises a pressure responsive device adapted to be placed on the rump of said cow, indicating means associated with said device, operative after a period of approximately three seconds of continuous pressure on said device, whereby a second animal mounting said cow for such period will cause actuation of said means, said pressure responsive device including means providing a compressible chamber having a body of liquid therein and means for effecting a discharge of liquid from said pressure reponsive device after said period, and wherein said indicating means includes an element subject to staining upon wetting by said liquid and positioned to receive liquid discharged by operation of said discharge effecting means.

23. A device for indicating the period of heat in a cow which comprises a pressure responsive device adapted to be placed on the rump of said cow, indicating means associated with said device, operative after a period of approximately three seconds of continuous pressure on said device, whereby a second animal mounting said cow for such period will cause actuation of said means, said pressure responsive device including means providing a compressible chamber having a body of liquid therein, a liquid accumulator arranged to receive liquid from said chamber and to return liquid to said chamber upon release of pressure on said pressure responsive device and to discharge liquid onto said element upon continuous accumulation for said period.

24. A device for indicating the period of heat in a cow as set forth in claim 22 including means providing a metering passage for the discharge of liquid from said chamber and means for discharging liquid onto said element upon continuous flow of liquid through said passage for said period.

References Cited in the file of this patent

UNITED STATES PATENTS

| | | |
|---|---|---|
| 672,207 | Dunn | Apr. 16, 1901 |
| 703,101 | Ware | June 24, 1902 |
| 2,560,537 | Andersen | July 17, 1951 |
| 2,947,415 | Garth | Aug. 2, 1960 |